Oct. 12, 1971            J. E. DALTON            3,611,634
APPARATUS AND METHOD FOR PLANTING SEEDLINGS
Filed Jan. 27, 1970            2 Sheets-Sheet 1
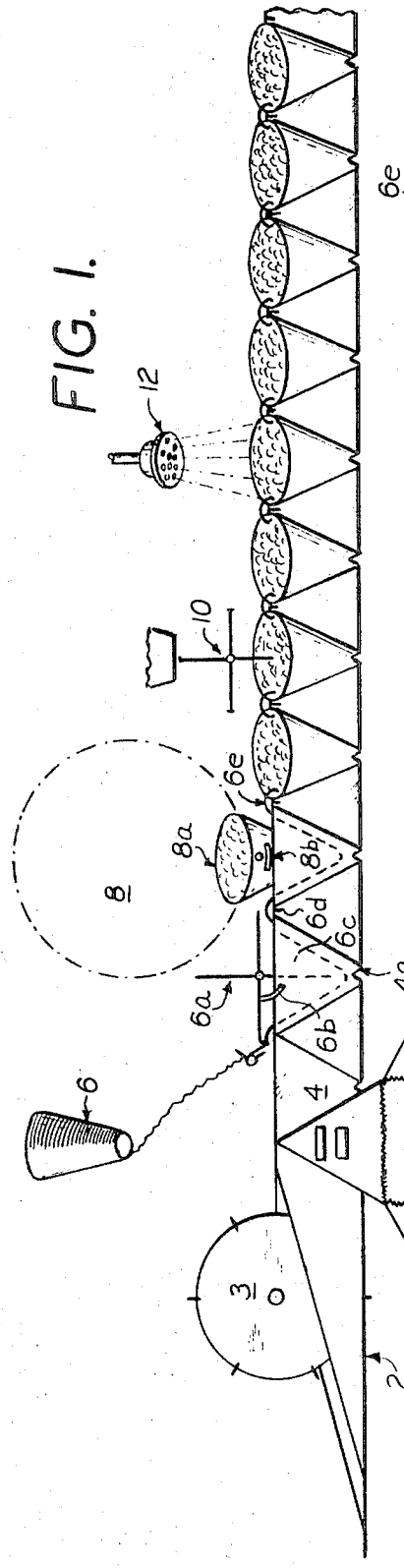
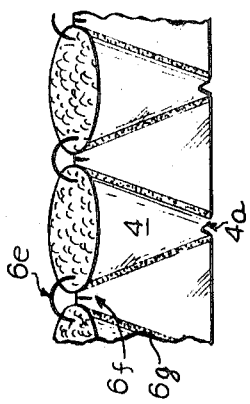
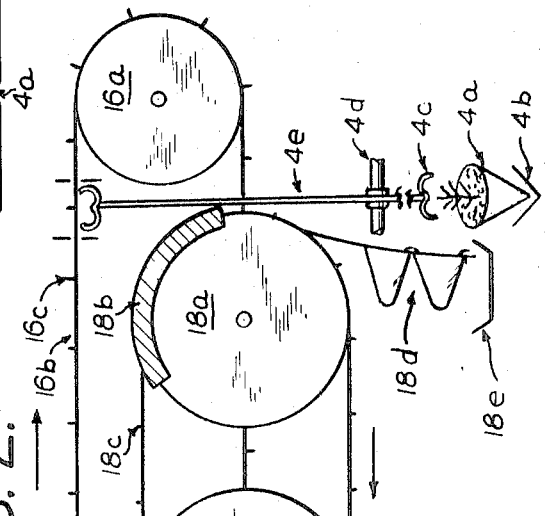
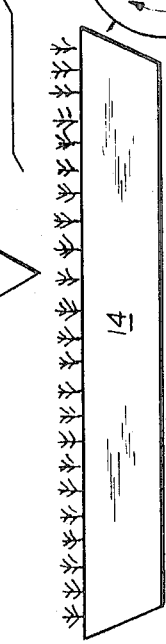
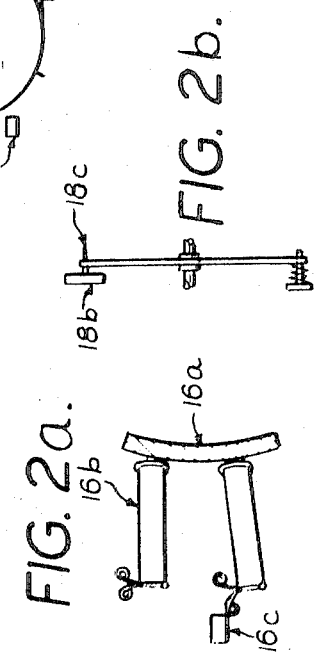
INVENTOR
JOHN E. DALTON

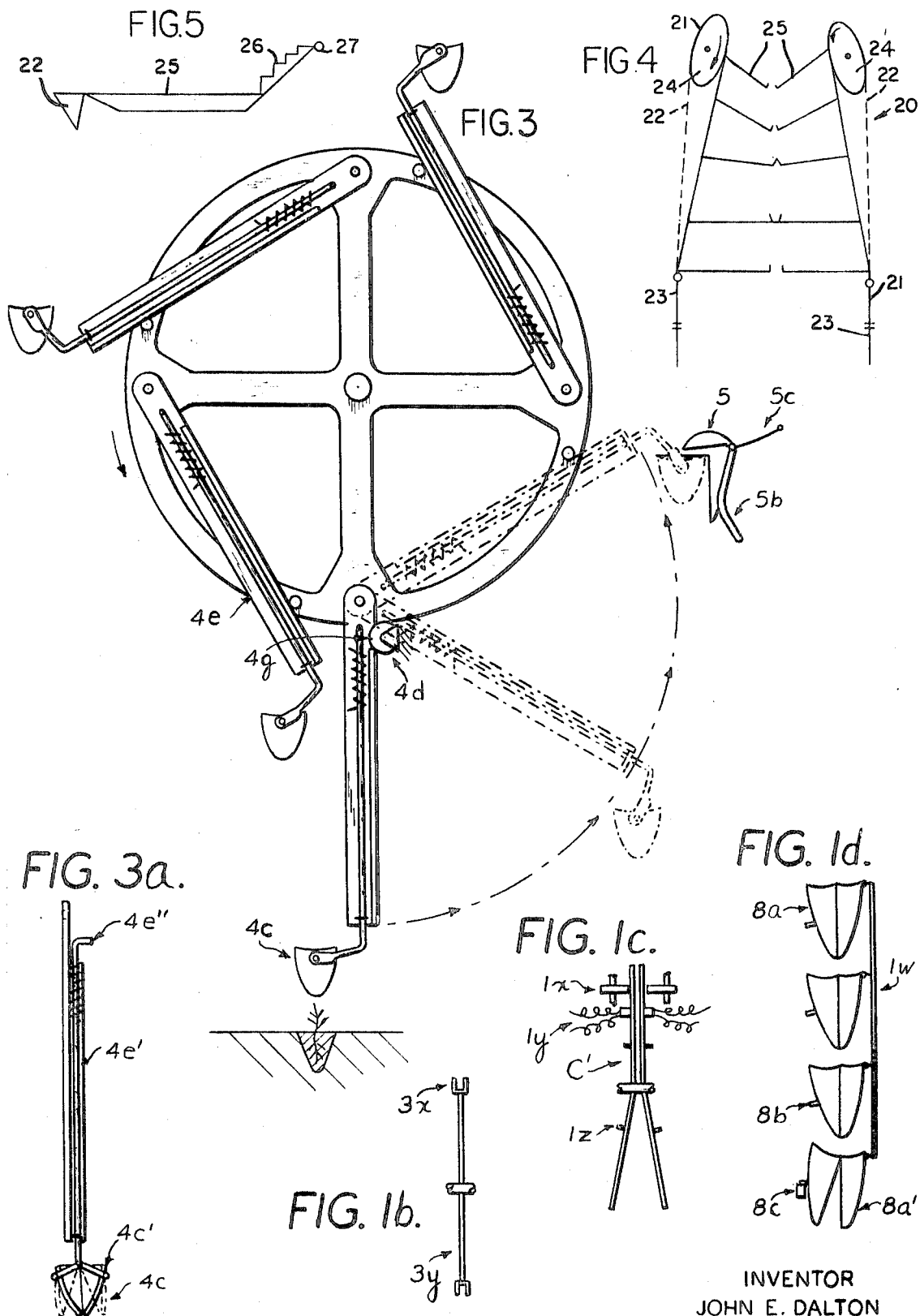

3,611,634
APPARATUS AND METHOD FOR PLANTING
SEEDLINGS
John E. Dalton, 1140 5th Ave., New York, N.Y. 10028
Continuation-in-part of application Ser. No. 668,761,
Sept. 19, 1967. This application Jan. 27, 1970,
Ser. No. 6,222
Int. Cl. A01g 9/10
U.S. Cl. 47—58
7 Claims

ABSTRACT OF THE DISCLOSURE

The strip of material is folded lengthwise and formed into a series of pockets which are connected together by intervening web portions. These pockets are of V-shaped contour and are adapted to receive charges of fertilized earth and seeds. In addition, a cord is looped into each of the pockets so as to permit intermeshing with the root system into the earth ball formed with the roots of the seedlings. Pulling up on the root embedded cord allows the earth ball to be moved up out of the pocket for subsequent transplanting purposes, completely mechanically with nonmanual feed-in.

---

This is a continuation-in-part of Ser. No. 668,761, filed Sept. 19, 1967, and now abandoned.

This invention relates to an apparatus and method for planting seedlings. More particularly, this invention relates to an apparatus and a method of planting, growing, transporting and field transplanting of seedlings from self-processed growing pots, mechanically and without the necessity of manual insertion.

It has been known that seedlings, for example, of rice, tobacco, tomato, cabbage, flowers and the like are grown in greenhouses and are subsequently set out in fields. During the initial stages of growth in the greenhouses cold frames or nursery plot, such seedlings are usually grown in shallow boxes called flats, in compounded compressed peat moss pots or in compartmentalized cell containers. After the seedlings have grown from the original seed to a point suitable for field planting, at present the seedlings are subjected to semi-mechanical transplanting techniques. For example, transplanting machines are presently in use in which the seedlings, which are first removed from the flats or other potting medium, are placed manually into planting machine buckets with or without the earth balls formed during the growth of the seed. In the case of the decomposable compound peat moss pots, such are generally placed along with the seedlings into the transplanting machines manually.

It is known that when seedlings are transplanted without the earth balls, the roots are damaged and shock results causing wilting, and delayed growth as well as a significant percentage of non-viable plants. Further, it is known that when compound peat moss pots are mounted along with the seedlings, that such is both relatively expensive and subject to a considerable loss by breakage in handling even if done manually.

Accordingly, it is an object of the invention to plant a seedling with an earth ball intact therewith.

It is another object of this invention to provide a method and apparatus for economically planting seedlings.

It is another object of this invention to be able to plant the seedling without causing root shock or injury to the plant.

Briefly, the invention provides an apparatus and method for planting, completely mechanically, a seedling in which the earth ball formed during the growth of the seedling is planted along with the seedling. The apparatus of the invention is embodied in the combination of a plurality of interconnected pots and a cord which is inserted in the pots and is looped from pot to pot in continuity.

The pots are fabricated from a roll of strip material, such as plastic, cellophane, textile, and the like, of such a width that when folded produces the optimum height for planting for the species to be planted. After folding, the strip of material is formed so as to define a series of V-shaped pockets for receiving fertilized earth therein. The pockets are interconnected by the remaining portions of the strip. In addition, drainage holes are formed by perforations in the bottoms of each pocket.

The cord is of any suitable material such as gauze, twine string, or cord and is layed into the series of V-shaped pockets formed by the strip of material so as to depend a substantial distance into each of the pockets while forming a loop in passing from pocket to pocket.

In use, after a series of pockets have been formed from a strip of material and a loop of cord is inserted into each pocket, the pockets are immediately filled with a measured quantity of suitable fertilized soil. The pockets are then seeded with individual seeds in any suitable manner, as is known, watered and then closely packed, by serpentining the continuous pot system into large jumbo flats. Such flats may be of a size to occupy about ¼ of the bottom area of a truck trailer as used in transporting the flats to and from greenhouse sites and to the ultimate transplanting site. The flats may also be constructed to have at least one detachable side. In any event, the surface of the flats are substantially completely closely filled by pressing the pot systems closely together in order to avoid any waste of growing space in the greenhouse. The watered plants and the flats are then stacked by forms in magazines and stored in a warm warehouse during the period of germination and sprouting. Thus, valuable greenhouse occupancy is shortened for economic reasons.

When the germination and sprouting time has passed, the magazines of seeded and sprouted pots in magazine flats are loaded onto suitable truck trailers, for example, four magazines of flats to a trailer, by any suitable means such as cranes, overhead rails, dollies and the like and transported, for example, to specially designed or modified greenhouses. The magazines are then positioned and the flats mechanically positioned in a manner, reverse to the manner used for stacking and loading.

In order to transplant the seedlings after such has developed a root system which becomes firmly intermeshed with the fertilized soil as well as in and about the cord, a flat of such seedlings is transported to a transplating site. Then, in any suitable fashion, for example, manually the strip material containing the series of pockets or pots is let out from the flat onto a suitable conveying device. As the conveying device passes over the respective planting site, suitable means are inserted under the loops formed by the cord between the individual pockets. The pockets are then stripped from the earth ball intermeshed with the cord in the roots of the seedling. Since the cord has become integral with the earth ball and root system, the integrity of the earth ball is retained during stripping. The seedling together with the earth ball is then placed into the planting site, for example, the ground. The process of transplanting a series of such produced seedlings can be done on a continuous basis such that the interconnected pots are stripped in sequential fashion from the seedling and earth ball combinations, the cord is cut at each side of the seedling earth ball, and each seedling and earth ball is dropped into a suitable planting site in a spaced manner. The firm gripping of the earth ball and cord by the root system occurs invariably when plants or seedlings grow in a restricted earth supply.

These and other objects and advantages of the invention will become more apparent when taken in conjunction with the following detailed description and the accompanying drawings in which:

FIG. 1 schematically illustrates a process of forming a series of pockets in a strip of material and of planting a seed therein;

FIG. 1a illustrates an enlarged view of a pair of pockets and a loop of cord disposed therebetween according to the invention;

FIG. 1b illustrates a view of a means for perforating the pockets to form drainage holes according to the invention;

FIG. 1c illustrates a view of a mechanism for making the portions between the pockets of a strip of material integral;

FIG. 1d illustrates a fragmentary view of a means for discharging a charge of soil into the pockets as shown in FIG. 1;

FIG. 2 schematically illustrates a view of a transplanting mechanism;

FIG. 2a illustrates a view of a means for grasping the loop of cord between a pair of adjacent pockets during a pot stripping operation;

FIG. 2b illustrates a view of a means for stripping the pot from the earth ball during a transplating operation;

FIG. 3 illustrates a mechanism for transplating a seedling with an attached earth ball;

FIG. 3a illustrates a detail of the mechanism of FIG. 3;

FIG. 4 schematically illustrates a means for automatically severing the cord between a pair of pockets for transplanting; and FIG. 5 illustrates a view of a cutter of the mechanism of FIG. 4.

Referring to FIG. 1, a strip of material, for example, of thermoplastic material, is lead off a supply roll or extruder (not shown) and is passed by a wheel 3 which serves to perforate the strip at precise points while folding the strip substantially in half. The folded strip is then passed through a wheel 1c which serves to crimp and fuse the material in certain alternating areas so as to form V-shaped pockets 4.

Referring to FIGS. 1 and 1c, the wheel 1c is of any suitable construction, for example, a rotating star having pairs of variable triangular extensions c' hinged at 1z compressed against each other by suitable cams 1x and heated by electrical elements 1y. The triangular extensions c' can, as shown in FIG. 1, be hinged to the main body of the starwheel as is known so as to be moved towards and away from each other. The electrical elements 1y serve to heat up the extensions c' so that the extensions upon pressing against the material can fuse the sides of the strip of material together.

Referring to FIG. 1, after the pockets 4 have been formed, a cord 6c is delivered from a spool 6 into the pockets. A suitable mechanism 6a is also provided which has radiating arms which upon rotation of the mechanism forces the cord into each pocket in sequence for a substantial distance. The cord 6c is thus formed into a serpentine shape to pass from pocket to pocket with a loop 6e being exposed between adjacent pockets. A cam 6b may also be provided on the mechanism 6a for activating the gripping and releasing of the various cord loops. Thereafter, the pockets with the cord therein are passed below a wheel 8 which fills each with earth.

Referring to FIGS. 1 and 1d, the wheel 8 has a series of bivalve cups 8a for delivering measured quantities of fertilized earth to each pocket 4. Each of the cups 8a carries a lip 8b which projects into the plane of the cam 8c. Upon moving against the cam 8c, the lips 8b open the bivalve cups 8a so as to permit the depositing of a charge of soil into a pocket 4 in the strip of material.

Referring to FIG. 1, after the soil has been deposited the series of pockets are moved under a seed sowing device 10 as is well known in the art. At this point, a seed is placed within the soil of each pocket 4. Thereafter, the pockets move under a suitable watering device 12 and are watered so as to institute germination of the seed.

Referring to FIG. 1b, the drainage hole 4a can be formed with a slit 6f between each pair of adjacent pockets 4. Each slit 6f is positioned in the connecting sections between the pockets 4 for purposes as described below. The loop 6e of cord is of sufficient size so as to project slightly upwardly of the plane of the pocket 4 across the plane of the slits 6f. However, the loop 6e may also be disposed along the top surfaces of the pockets 4. The drainage holes 4a may be of triangular cross section as shown or of any other suitable shape so as to allow for drainage of the pockets.

Referring to FIG. 1b, the drainage hole 4a can be formed in the strip of material by a cutting die 3x formed on an arm 3y of the wheel 3; the arm 3y being mounted in any suitable manner on the wheel 3. Alternatively, the drainage hole can be formed in any other suitable manner as is known. For example, the holes 4a can be formed after folding and before placement of the soil.

During the growth of the seed into a seedling the roots which develop become intermeshed within the soil in each pocket as well as intimately and firmly around the cord disposed within each pocket. In a sense, an integral mass is formed by the roots system of roots, earth ball and cord loop.

Referring to FIG. 2, when ready for transplanting, a special outsize flat 14 filled with grown seedlings is positioned adjacent a pair of reciprocating opposed chain belt systems 16–16a and 18–18a of known construction. The upper system 16–16a has suitable grips 16–16c (FIG. 2) which grip the exposed loops of cord as the strip of pots pass along the system. The grips 16b, 16c penetrate through the slits 6f formed between the pockets 4 so as to aid in carrying the pots past the stripping system 18–18a. Near the end of the reach of the stripping system, the strip of material is stripped downwardly while the plant with its uncovered earth ball is carried by the grips 16b, 16c onward for planting. At the same time, or shortly thereafter, the loops 6e of cord between the respective seedlings are cut so that the individual seedlings and earth ball can be transplanted by a suitable mechanism 4e.

Referring to FIG. 2 and 3, the transplanting mechanism 4e has a plurality of extendable arms 4e which carry grasping pods 4c at the ends. Each of these grasping pods 4c is adapted to receive an individual seedling and earth ball from the system 16–16a.

When the arm 4e passes a cam 4d disposed in a stationary manner at a lower end of the mechanism 4e, the arm 4e is moved outwardly until reaching a gate 4g. At this point, the pod is released to flip back into a ready/rest position while at the same time opening the pod to drop the seedling into a ground hole under the weight of the earth ball retaining it in an upright position. As shown in FIG. 3, each arm includes a spring biased rod 4e" which moves downwardly under the direction of the gate 4g so as to separate the pod section 4c to permit dropping of the earth ball and seedling. Wheel tampers, as are known, can then be used to embed the seedling in place.

Referring to FIG. 3, in order to sever the loops of cord 6a between the various pockets, a suitable cutting edge 5 can be positioned at a point immediately before the planting mechanism 4e. Such a cutting edge 5 can utilize an epicentric spring 5c for positioning the cutting edge so as to avoid cutting plant foliage.

Referring to FIG. 4, an alternative stripping mechanism 20 can be provided for cutting the loops of cord between adjacent pockets of potted material. For example, as shown, a pair of chain belt assemblies 21 are mutually mounted in horizontal disposition. Each assembly 21 has an endless chain belt 22, for example, of triangular cross-section, disposed around a first roller 23 disposed in a vertical plane and a second roller 24 disposed at an angle to the first roller. One of these rollers 23, 24 serves as a drive roller and is driven from any suitable power source, (not shown,) for example, a mechanical transmission. Each endless chain belt 22 carries a plurality of cord grasping fingers 25 thereon in spaced relationship. Due to the angular disposition imparted to the endless chains 22, the cord grasping fingers 25 which are perpendicular to the chain belt 22 are initially disposed in a downwardly directed position over the angulated roller 24 and thereafter are moved into a horizontal position along the end of the reach of the chain belt 22 near the vertical roller 23. In this way, as a series of interconnected pockets of potted seedlings are moved through the system for the angulated roller 23 end to the vertical roller 24 end, the cord grasping fingers 25 are initially disposed below the plane of the loops of cord as well as the slits in the material. During further passage the cord grasping fingers 25 are moved upwardly to pass between the pots and through the slits and thereafter are elevated to grasp and hold the loops of cord therebetween. The vertical rolls 23 of the system 20 are also spaced farther apart than the angulated rollers 24. This permits the cord grasping fingers to move apart from each other near the end of the reach of the system 20.

Referring to FIG. 5, each of the cord grasping fingers 25 is provided with a saw tooth edge 26 which is sharpened only on the undersides of each tooth so that as the fingers 25 are separated from each other they cut the cord in a scissor fashion and thereby segregate the seedlings from each other. Each of the cord grasping fingers 25 may also have a roller 27 or blunt end formed thereon to permit the finger 25 to move up and over the web of material interconnecting the pockets until reaching the slits in the upper edge of the web. The blunt ends 27 will then penetrate through the slits to the opposite side so as to cooperate with the other finger 25 to grasp and hold in an elevated position that side of the potted seedlings. A stripping operation can then be carried out to strip the web of material from the earth balls of the seedlings while the seedlings and earth ball are carried together into a transplanting mechanism as is known.

The invention thus provides a suitable means for planting a seedling with its earth ball without causing damage to the earth ball. As described above, the cord which is utilized by the invention succeeds in maintaining the integrity of the earth ball during stripping from the material forming the pot for the seedling.

It is noted that in order to further enhance the integration of the cord with the root system of the seedling, that a suitable liquid fertilizer can be impregnated into the cord to enhance the attraction between the roots and the cord.

It is noted that the invention can provide a simple and economic technique for the growing and planting and transplanting of large numbers of seedlings. Greenhouses, presently in use, require little modification to make them easily useable and the modern trend to an automated greenhouse would be further modified by having horizontal slit doors across the ends, slightly sloping floors and permanent dolly rollers to allow gravity positioning of the flats with maximum efficiency. When the growth period has lapsed, flats of the seedling could then be reassembled in magazines, again in required levels depending on the height of the plants, acclimatized to outdoor exposure and then transported to a prepared field for final setting out by loading the magazine onto a transporting machine, removing a corresponding sidewall of each flat and interconnecting the webbing and cord between pots between each flat.

The number of planting rows would depend on the weight of the magazines, as each row would normally share a separate magazine, and the condition of the earth in relation to weight bearing.

To begin planting the flats, the end of the row of pots on the bottom flat of the magazine would be manually threaded into the space between the two endless belt/chain systems and the machine activated to the position where the first seedling is ready to be gripped by the rotating planting pods or grip fingers.

When this has been done and the machine is in position for dropping the first plant in the row, the entire mechanism including both the rotational and linear elements are then put into action by means of a clutch.

The transplanting mechanism can readily be made to be self-propelled or drawn by a tractor with or without power take-off. Features well known to the art such as furrow making, roller tampers, row markers etc. could be incorporated. Two usual features, watering and fertilizing attachments could be obviated as the plants would have their earth balls well watered and fertilized prior to delivery and since their earth balls are intact and undamaged would require no extra attention other than normal care given any established growing plant, including cultivation, weed control and where necessary or desirable irrigation.

What is claimed is:

1. In a method of seeding plants into self processed individual pots, the steps of folding a strip of material into a plurality of V-shaped pockets, placing fertilized earth and a seed therein with fixed together material portions between each pair of adjacent pockets, and inserting a cord having loops into each of the pockets with said cord extending along said strip of pockets for stripping of each pocket from an earth ball subsequently formed from fertilized earth and seedling roots in said pocket.

2. In a method as set forth in claim 1 which includes the subsequent steps of stripping the strip of material from the earth ball and severing the cord between adjacent earth balls to segregate each earth ball from an adjacent earth ball.

3. An apparatus for planting comprising a plurality of interconnected pots formed of a strip of plastic material folded into V-shaped pockets having intervening web portions integral therewith, each of said pockets having a drainage hole in the bottom thereof, and each of said web portions having slits therein at the tops thereof between the openings of said pockets, said pockets being adapted to receive fertilized earth, seeds and successive loops of a cord adapted to entwine with plant roots resulting from the growth of seedlings, and being further adapted to strip said roots and fertilized earth from said pockets when removed from the latter.

4. In combination,
a strip of material folded into a plurality of V-shaped pockets for receiving fertilized earth and a seed therein and having fixed together portions between each pair of adjacent pockets;
a cord having loops inserted into each of said pockets for firm cohesive gripping within a root system of a seedling grown from the seed within each pocket, said core extending along said strip of pockets for ultimate stripping of each pocket from the earth ball formed from the fertilized earth and resultant root system in said pocket; and
a charge of fertilized earth in each said pocket.

5. The combination as set forth in claim 4 wherein each pocket has a drainage hole in the bottom thereof.

6. The combination as set forth in claim 4 wherein said strip has a plurality of slits therein, each slit being disposed in a fixed together portion between each pair of adjacent pockets under said cord for penetration of a grip to grip said loop portions of cord between the adjacent pockets to strip said pockets from the earth ball.

7. The combination as set forth in claim 4 wherein said strip is of plastic material.

References Cited

UNITED STATES PATENTS

| | | | |
|---|---|---|---|
| 2,980,041 | 4/1961 | Nielsen | 111—3 |
| 3,063,197 | 11/1962 | Brooks | 47—37 X |
| 3,139,701 | 7/1964 | Nishiuchi | 47—37 X |

FOREIGN PATENTS

| | | |
|---|---|---|
| 737,660 | 9/1955 | Great Britain. |
| 13,879 | 1896 | Great Britain. |
| 74,703 | 5/1917 | Austria. |

ROBERT E. BAGWILL, Primary Examiner

U.S. Cl. X.R.

47—34.13

UNITED STATES PATENT OFFICE
CERTIFICATE OF CORRECTION

Patent No. 3,611,634　　　　　　　　　　Dated October 12, 1971

Inventor(s)　　　John E. Dalton

It is certified that error appears in the above-identified patent and that said Letters Patent are hereby corrected as shown below:

Column 2, line 55 insert "of" after --strip--

Column 4, line 12, change "Referring to Fig. 1b, the drainage hole 4a can be formed" and insert:

--Referring to Fig. 1a, the strip of material can also be formed--

Signed and sealed this 21st day of March 1972.

(SEAL)
Attest:

EDWARD M. FLETCHER, JR.　　　　ROBERT GOTTSCHALK
Attesting Officer　　　　　　　　Commissioner of Patents